(12) United States Patent
Kalagnanam et al.

(10) Patent No.: US 9,031,798 B2
(45) Date of Patent: May 12, 2015

(54) SYSTEMS AND METHODS FOR SOLVING LARGE SCALE STOCHASTIC UNIT COMMITMENT PROBLEMS

(75) Inventors: Jayant R. Kalagnanam, Tarrytown, NY (US); Ali Koc, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 13/414,044

(22) Filed: Mar. 7, 2012

(65) Prior Publication Data
US 2013/0238546 A1 Sep. 12, 2013

(51) Int. Cl.
*G06N 7/02* (2006.01)
*G06N 7/06* (2006.01)
*G06N 5/02* (2006.01)
*G06F 17/00* (2006.01)

(52) U.S. Cl.
CPC . *G06N 5/02* (2013.01); *G06F 17/60* (2013.01)

(58) Field of Classification Search
None
See application file for complete search history.

(56) References Cited

U.S. PATENT DOCUMENTS

| 6,021,402 | A | 2/2000 | Takriti | |
|---|---|---|---|---|
| 2006/0089864 | A1* | 4/2006 | Feng et al. | 705/7 |
| 2012/0122505 | A1* | 5/2012 | Dotzler et al. | 455/509 |

OTHER PUBLICATIONS

Villa et al. "A Column-Generation and Branch-and-Cut Approach to the Bandwidth-Packing Problem", J. of Research of NIST, vol. 111, No. 2, 2006, pp. 161-185.*

Parvania et al. "Reliability-Constrained Unit Commitment using Stochastic Mixed-Integer Programming", IEEE 2010, pp. 200-205.*

Kaut, M., "Scenario tree generation for stochastic programming: Cases from finance", doctoral thesis, 2003, pp. 1-140.

Ruiz, P. et al., "Applying Stochastic Programming to the Unit Commitment Problem", PMAPS 2008, pp. 1-6.

United States Office Action dated May 14, 2014 received in related U.S. Appl. No. 13/414,122.

Dillon, T., et al., "Integer programming approach to the problem of optimal unit commitment with probabilistic reserve determination", IEEE Transactions Power Systems, Nov. 1978, pp. 2154-2166.

Snyder, W.L., et al., "Dynamic programming approach to unit commitment", IEEE Transactions Power Systems, May 1987, vol. 2, Issue 2.

Takriti, S., et al., "Incorporating fuel constraints and electricity spot prices into the stochastic unit commitment problem", Operations Research, Mar.-Apr. 2000, vol. 48, No. 2, pp. 268-280.

Ouyang, Z., et al.,"Short-term unit commitment expert system", Electric Power Systems Research, Dec. 1990, vol. 20, Issue 1.

Saneifard, S., et al., "A fuzzy logic approach to unit commitment", IEEE Transactions on Power Systems, May 1997, vol. 12, Issue 2, pp. 0885-8950.

Mantawy, A. H., et al., "Integrating genetic algorithms, tabu search and simulated annealing for the unit commitment problem," IEEE Transactions Power Systems, Aug. 1999, vol. 14, Issue 3, pp. 829-836.

(Continued)

*Primary Examiner* — Li-Wu Chang
(74) *Attorney, Agent, or Firm* — Scully, Scott, Murphy & Presser, P.C.; Daniel P. Morris, Esq.

(57) ABSTRACT

The present disclosure relates generally to computational solution algorithms (and associated systems and methods) applied to a stochastic unit commitment problem. In one example, the computational solution algorithms (and associated systems and methods) may be applied to the energy industry.

13 Claims, 4 Drawing Sheets

(56) References Cited

OTHER PUBLICATIONS

Sheble, G.B., et al., "Unit commitment—Literature synopsis", IEEE Transactions on Power Systems, Feb. 1994, vol. 9, Issue 1, pp. 128-135.
Padhy, N. P., "Unit commitment—A bibliographical survey", IEEE Transactions on Power Systems, May 2004, vol. 19, Issue 2, pp. 1196-1205.
Wood, A. J., et al., "Power Generation Operation and Control", Wiley-Interscience, Jan. 1996.
http://www.ferc.gov/industries/electric/indus-act/joint-boards/final-cong-rpt.pdf, "Security-Constrained Economic Dispatch: Definition, Practices, Issues and Recommendations", Jul. 2006.
Mukerji, R., "NYISO Day-ahead unit commitment design," Technical Conference on Unit Commitment Software, Federal Energy Regulatory Commission, Jun. 2010.
Ott, A., "Unit commitment in PJM Day-ahead and Real-time Markets", Technical Conference on Unit Commitment Software, Federal Energy Regulatory Commission, Jun. 2010.
Rothleder, M., "Unit commitment in the CAISO market", Technical Conference on Unit Commitment Software, Federal Energy Regulatory Commission, Jun. 2010.
Ahmed, A., et al., "A Multistage Stochastic Integer Programming Approach for Capacity Expansion under Uncertainty", May 2003, vol. 26, Issue 1.
Singh, K. J., et al., "Dantzig-wolfe Decomposition for Solving Multistage Stochastic Capacity-Planning Problems" Operations Research, Sep.-Oct. 2009, vol. 57, No. 5, pp. 1271-1286.
Lulli, G., et al., "A Branch-and-Price Algorithm for Multistage Stochastic Integer Programming with Application to Stochastic Batch-Sizing Problems", Management Science, Jun. 2004, vol. 50, No. 6, pp. 786-796.
Barahona, F., et al., "The volume algorithm:producing primal solutions with a subgradient method", Mathematics Subject Classification, May 2000, pp, 385-399.
Barahona, F., et al., "Plant location with minimum inventory", Mathematical Programming, Sep. 1998, vol. 83, Issue: 1-3.
Barnhart, C., et al., "Branch-and-price: Column Generation for Solving Huge Integer Programs", Operations Research, May-Jun. 1998, vol. 46 Issue 3, pp. 316-329.
Kerr, H., et al., "Unit Commitment", IEEE Transactions on Power Apparatus and Systems, May 1966, vol. 85, No. 5.
Lubbecke, M.E., et al., "Selected Topics in Column Generation", Operations Research, Nov.-Dec. 2005, vol. 53, No. 6, pp. 1007-1023.
Merle, O., et al., "Stabilized Column Generation", Discrete Math, Nov. 1997, vol. 194.
Rajan, D. et al., "Minimum Up/Down Polytopes of the Unit Commitment Problem with Start-Up Costs", IBM Research Division, Jun. 2005.
Shiina, T., et al., "Stochastic unit commitment problem", International Transactions in Operational Research, Jan. 2004, vol. 11, Issue 1, pp. 19-32.
Silva, E.F., et al. "Solving a class of stochastic mixed-integer programs with branch and price", Mathematical Programming: Series A and B, Sep. 2006, vol. 108, Issue 2.
https://projects.coin-or.org/Bcp, "Branch-Cut-Price Framework", last modified 3 years ago.
Desrosiers, J., et al., "Branch-Price-and-Cut Algorithms", Wiley Encyclopedia of Operations Research and Management Science, Apr. 2010.
Ljubic, I., "A Branch-Price-and-Cut Algorithm for Vertex-Biconnectivity Augmentation", Networks, Oct. 2010, vol. 56, Issue 3, pp. 169-182.
Savelsbergh, M., "A Branch-and-Price Algorithm for the Generalized Assignment Problem", Operations Research, Nov.-Dec. 1997, vol. 45, No. 6.
Akella, M., et al., "Branch and Price: Column Generation for Solving Huge Integer Programs", University at Buffalo, created Oct. 29, 2011, Department of Industrial Engineering.
Ladanyi, L., et al., "Software Tools for Implementing Branch, Cut, and Price Algorithums", INFORMS Annual Meeting, Nov. 20, 2002.
Salam, S., "Unit Commitment Solution Methods", Proceedings of World Academy of Science, Engineering and Technology, Dec. 2007, vol. 26.
Uyar, S., "Evolutionary Algorithms for the Unit Commitment Problem", Turkish Journal of Electrical Engineering & Computer Sciences, Nov. 2008, vol. 16, No. 3.

* cited by examiner

SYSTEMS AND METHODS FOR SOLVING LARGE SCALE STOCHASTIC UNIT COMMITMENT PROBLEMS

CROSS-REFERENCE TO RELATED APPLICATIONS

The present disclosure relates to commonly-owned, U.S. patent application Ser. No. 13/414,122, filed Mar. 7, 2012, now U.S. Pat. No. 8,949,160, entitled SYSTEMS AND METHODS FOR GENERATING WIND POWER SCENARIOS FOR WIND-POWER-INTEGRATED STOCHASTIC UNIT COMMITMENT PROBLEMS, the entire contents and disclosure of which is incorporated by reference as if fully set forth herein.

BACKGROUND

The present disclosure relates generally to computational solution algorithms (and associated systems and methods) applied to a stochastic unit commitment problem. In one example, the computational solution algorithms (and associated systems and methods) may be applied to the energy industry.

The unit commitment problem lies at the heart of the future smart grid. Independent system operators and utilities aim to solve various forms of the unit commitment problem that handle such contemporary concepts as renewable generation, energy storage, power purchase agreements, future power markets, demand response, load shifting, etc. These concepts induce various forms of uncertainty into the problem. Embodiments of the invention use a multistage stochastic programming framework to incorporate these uncertainties into the unit commitment problem, and present a system of approaches to solve the resulting large scale nonlinear stochastic unit commitment problem. In one specific example, a new parallel decomposition algorithm to solve the stochastic unit commitment problem using a branch-cut-price framework is provided.

DESCRIPTION OF RELATED ART

Typically, general-purpose solvers, which don't utilize any problem structure, are used to solve a stochastic unit commitment problem. The survey by Padhy ("Unit commitment—A bibliographical survey," IEEE Transactions on Power Systems, 19 (2004), pp 1196-2005) summarizes some solution methods that have been implemented in the literature.

SUMMARY

As described herein, one embodiment provides a decomposition algorithm that both utilizes the problem structure and lends itself well to parallel computing. In one example, a parallel branch-cut-price algorithm is provided to solve a large-scale stochastic unit commitment problem. In another example, parallelization-friendly techniques such as asynchronization, early termination, and dual weighting may be utilized. In another example, the problem structure may be exploited, thus, solving the problem faster. In another example, the algorithm may lend itself to parallelization better than conventional solution techniques.

In one embodiment, a system for solving a stochastic unit commitment problem using a branch-cut-price algorithm is provided, the system comprising one or more processor units configured for: iteratively generating a plurality of candidate columns by operating on a restricted master linear problem and a corresponding dual problem; and solving a pricing problem for the candidate columns; wherein the generation of the candidate columns includes: maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list; at each iteration of the candidate column generation using a weighted dual solution $\bar{\theta}$ to solve the pricing problem;

wherein $\bar{\theta} = w\theta^* + w_1\theta_1 + \ldots + w_k\theta_k$, $w \geq 0$, $w_i \geq 0$, $i=1,\ldots,k$, $w + \Sigma_{i=1,\ldots,k} w_i = 1$, and wherein $\theta_1, \ldots, \theta_k$ corresponds to the dual solutions that are in the list (e.g., dual solutions that provide the best k lower bounds for the MLP).

In one example, the "inserting the checked lower bound into the appropriate position in the list", may refer to the following: The list keeps lower bounds in a descending order. So, if the new lower bound is larger than any of the lower bounds in the list, it is inserted into the appropriate position so that the list is still in descending order after the insertion. (e.g., the list grows by one unit, and if its size exceeds the maximum size, the smallest lower bound is deleted.)

In another example, e may be the vector of ones, $\lambda^*$ may be the optimal primal solution and $\theta^*, \alpha^*$ may be the optimal dual solution.

In another embodiment, a system for solving a stochastic unit commitment problem using a branch-cut-price algorithm is provided, the system comprising one or more processor units configured for: iteratively generating in a sequential manner a plurality of candidate columns by operating on a restricted master linear problem and a corresponding dual problem; and solving, in parallel for at least two of the candidate columns, a pricing problem.

In another embodiment, a system for solving a stochastic unit commitment problem using a branch-cut-price algorithm is provided, the system comprising one or more processor units configured for: iteratively generating a plurality of candidate columns by operating on a restricted master linear problem and a corresponding dual problem, wherein each of the candidate columns is generated based upon a first demand value; and for x number of the iterations of the candidate generation, wherein x is an integer: maintaining each of the candidate columns that had a solution value greater than a threshold; and for each of the candidate columns that did not have a solution value greater than the threshold, solving the unit commitment problem with a second demand value, wherein the second demand value is different from the first demand value.

In another embodiment, an article of manufacture is provided, comprising: at least one tangible computer usable medium having a computer readable program code logic tangibly embodied therein to execute at least one machine instruction in a processing unit for solving a stochastic unit commitment problem using a branch-cut-price algorithm, said computer readable program code logic, when executing, performing the following steps: iteratively generating a plurality of candidate columns by operating on a restricted master linear problem and a corresponding dual problem; and solving a pricing problem for the candidate columns; wherein the generation of the candidate columns includes: maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list; at each iteration of the candidate column generation using a weighted dual solution $\bar{\theta}$ to solve the pricing problem;

wherein $\bar{\theta}=w\theta^*+w_1\theta_1+\ldots+w_kw\theta_k$, $w\geq 0$, $w_i\geq 0$, $i=1,\ldots,k$, $w+\Sigma_{i=1,\ldots,k}w_i=1$, and wherein $\theta_1,\ldots,\theta_k$ corresponds to the dual solutions that are in the list (e.g., dual solutions that provide the best k lower bounds for the MLP).

In one example, the "inserting the checked lower bound into the appropriate position in the list", may refer to the following: The list keeps lower bounds in a descending order. So, if the new lower bound is larger than any of the lower bounds in the list, it is inserted into the appropriate position so that the list is still in descending order after the insertion. (e.g., the list grows by one unit, and if its size exceeds the maximum size, the smallest lower bound is deleted.)

In another example, e may be the vector of ones, $\lambda^*$ may be the optimal primal solution and $\theta^*,\alpha^*$ may be the optimal dual solution.

In another embodiment, an article of manufacture is provided, comprising: at least one tangible computer usable medium having a computer readable program code logic tangibly embodied therein to execute at least one machine instruction in a processing unit for solving a stochastic unit commitment problem using a branch-cut-price algorithm, said computer readable program code logic, when executing, performing the following steps: iteratively generating in a sequential manner a plurality of candidate columns by operating on a restricted master linear problem and a corresponding dual problem; and solving, in parallel for at least two of the candidate columns, a pricing problem.

In another embodiment, an article of manufacture is provided, comprising: at least one tangible computer usable medium having a computer readable program code logic tangibly embodied therein to execute at least one machine instruction in a processing unit for solving a stochastic unit commitment problem using a branch-cut-price algorithm, said computer readable program code logic, when executing, performing the following steps: iteratively generating a plurality of candidate columns by operating on a restricted master linear problem and a corresponding dual problem, wherein each of the candidate columns is generated based upon a first demand value; and for x number of the iterations of the candidate generation, wherein x is an integer: maintaining each of the candidate columns that had a solution value greater than a threshold; and for each of the candidate columns that did not have a solution value greater than the threshold, solving the unit commitment problem with a second demand value, wherein the second demand value is different from the first demand value.

In another embodiment, a method for solving a stochastic unit commitment problem using a branch-cut-price algorithm is provided, the method comprising: iteratively generating a plurality of candidate columns by operating on a restricted master linear problem and a corresponding dual problem; and solving a pricing problem for the candidate columns; wherein the generation of the candidate columns includes: maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list; at each iteration of the candidate column generation using a weighted dual solution $\bar{\theta}$ to solve the pricing problem;

wherein $\bar{\theta}=w\theta^*+w_1\theta_1+\ldots+w_k\theta_k$, $w\geq 0$, $w_i\geq 0$, $i=1,\ldots,k$, $w+\Sigma_{i=1,\ldots,k}w_i=1$, and wherein $\theta_1,\ldots,\theta_k$ corresponds to the dual solutions that are in the list (e.g., dual solutions that provide the best k lower bounds for the MLP).

In one example, the "inserting the checked lower bound into the appropriate position in the list", may refer to the following: The list keeps lower bounds in a descending order. So, if the new lower bound is larger than any of the lower bounds in the list, it is inserted into the appropriate position so that the list is still in descending order after the insertion. (e.g., the list grows by one unit, and if its size exceeds the maximum size, the smallest lower bound is deleted.)

In another example, e may be the vector of ones, $\lambda^*$ may be the optimal primal solution and $\theta^*,\alpha^*$ may be the optimal dual solution.

In another embodiment, a method for solving a stochastic unit commitment problem using a branch-cut-price algorithm is provided, the method comprising: iteratively generating in a sequential manner a plurality of candidate columns by operating on a restricted master linear problem and a corresponding dual problem; and solving, in parallel for at least two of the candidate columns, a pricing problem.

In another embodiment, a method for solving a stochastic unit commitment problem using a branch-cut-price algorithm is provided, the method comprising: iteratively generating a plurality of candidate columns by operating on a restricted master linear problem and a corresponding dual problem, wherein each of the candidate columns is generated based upon a first demand value; and for x number of the iterations of the candidate generation, wherein x is an integer: maintaining each of the candidate columns that had a solution value greater than a threshold; and for each of the candidate columns that did not have a solution value greater than the threshold, solving the unit commitment problem with a second demand value, wherein the second demand value is different from the first demand value.

BRIEF DESCRIPTION OF THE DRAWINGS

Various objects, features and advantages of the present invention will become apparent to one skilled in the art, in view of the following detailed description taken in combination with the attached drawing, in which.

DETAILED DESCRIPTION

Figure 1:
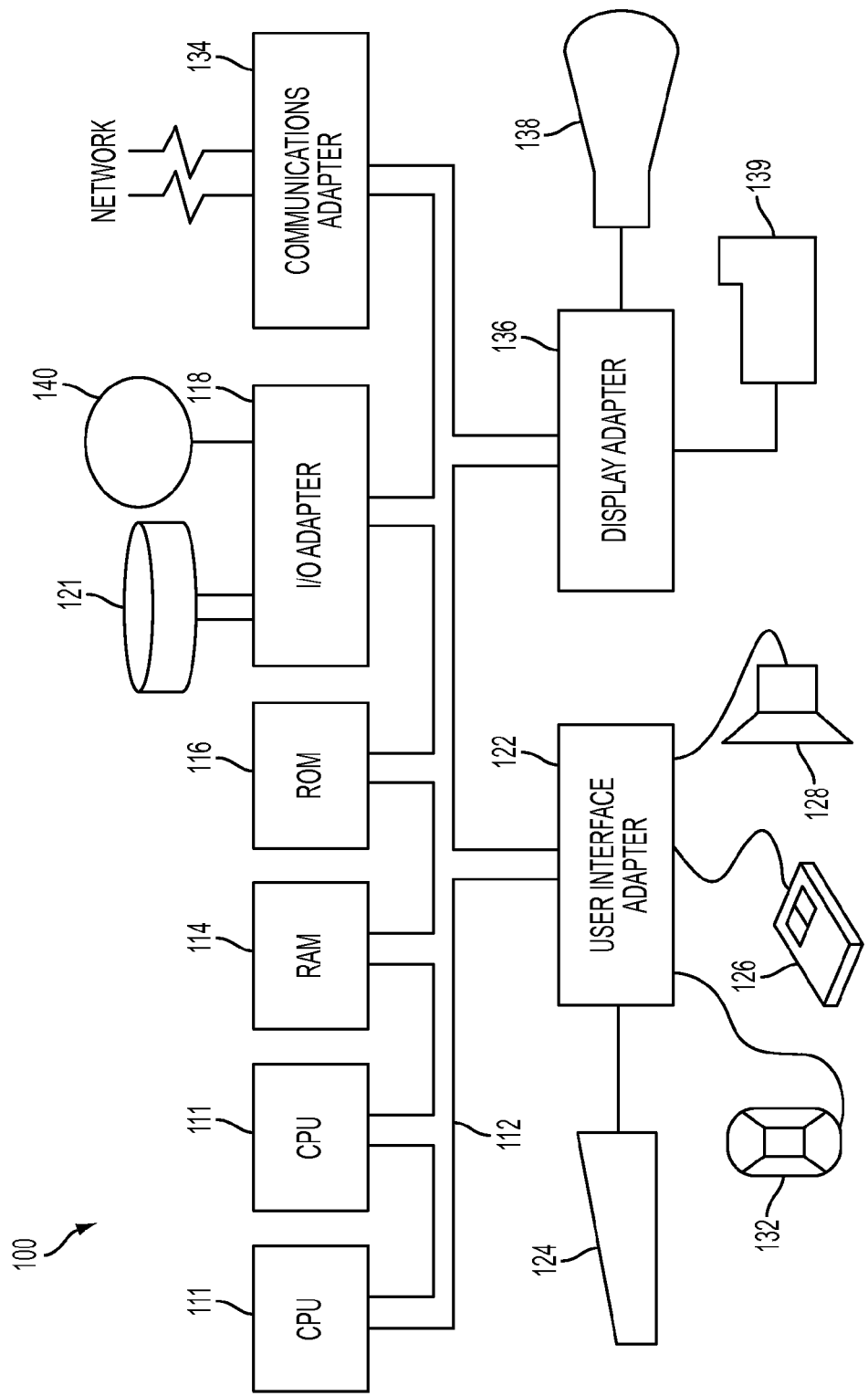
FIG. 1 depicts a block diagram of a system according to one embodiment of the present invention.

In one embodiment a system for solving a stochastic unit commitment problem using a branch-cut-price algorithm is provided, the system comprising one or more processor units configured for: iteratively generating a plurality of candidate columns by operating on a restricted master linear problem and a corresponding dual problem; and solving a pricing problem for the candidate columns; wherein the generation of the candidate columns includes: maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list; at each iteration of the candidate column generation using a weighted dual solution $\bar{\theta}$ to solve the pricing problem;

wherein $\bar{\theta}=w\theta^*+w_1\theta_1+\ldots+w_k\theta_k$, $w\geq 0$, $w_i\geq 0$, $i=1,\ldots,k$, $w+\Sigma_{i=1,\ldots,k}w_i=1$, and wherein $\theta_1,\ldots,\theta_k$ corresponds to the dual solutions that are in the list.

In one example, the restricted master linear problem comprises:

min c'λ
s.t. A'λ≥b :θ*
eλ=1 :α*
λ≥0;

wherein the corresponding dual problem comprises:

max α
s.t. θ(A'−b)+α≤c' :λ*
θ≥0;

wherein the pricing problem comprises:

$$\min_j c_j - \theta^*(A_j - b) - \alpha^* \Leftrightarrow \min_{x\in X}(c - \theta^*(A-b))x - \alpha^* \equiv z^* - \alpha^*; \text{ and}$$

wherein e is the vector of ones and λ*, θ*, α* are the optimal primal and dual solutions.

In another example, the generation of the candidate columns includes: maintaining the list of k best lower bounds; wherein the corresponding dual solutions are $(\theta_1,\alpha_1)$, $(\theta_2,\alpha_2),\ldots,(\theta_k,\alpha_k)$ such that $z_1\leq z_2\ldots\leq z_k$ where $z_i$, $i=1,\ldots,k$ are the optimal value of the pricing problem when $\theta_i$ is used; as the column generation proceeds, checking the lower bound at each iteration, and, if the checked lower bound is better than at least one of the lower bounds in the list, inserting the checked lower bound into the appropriate position in the list; at each iteration of the candidate column generation using a weighted dual solution $\bar{\theta}$ to solve the pricing problem;

wherein $\bar{\theta}=w\theta^*+w_1\theta_1+\ldots+w_k\theta_k$, $w\geq 0$, $w_i\geq 0$, $i=1,\ldots,k$, $w+\Sigma_{i=1,\ldots,k}w_i=1$, and wherein $\theta_1,\ldots,\theta_k$ corresponds to the dual solutions that are in the list.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

In another embodiment a system for solving a stochastic unit commitment problem using a branch-cut-price algorithm is provided, the system comprising one or more processor units configured for: iteratively generating in a sequential manner a plurality of candidate columns by operating on a restricted master linear problem and a corresponding dual problem; and solving, in parallel for at least two of the candidate columns, a pricing problem.

In one example, the restricted master linear problem comprises:

min c'λ
s.t. A'λ≥b :θ*
eλ=1 :α*
λ≥0;

wherein the corresponding dual problem comprises:

max α
s.t. θ(A'−b)+α≤c' :λ*
θ≥0;

wherein the pricing problem comprises:

$$\min_j c_j - \theta^*(A_j - b) - \alpha^* \Leftrightarrow \min_{x\in X}(c - \theta^*(A-b))x - \alpha^* \equiv z^* - \alpha^*;$$

and wherein e is the vector of ones and λ*, θ*, α* are the optimal primal and dual solutions.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

In another embodiment a system for solving a stochastic unit commitment problem using a branch-cut-price algorithm is provided, the system comprising one or more processor units configured for: iteratively generating a plurality of candidate columns by operating on a restricted master linear problem and a corresponding dual problem, wherein each of the candidate columns is generated based upon a first demand value; and for x number of the iterations of the candidate generation, wherein x is an integer: maintaining each of the candidate columns that had a solution value greater than a threshold; and for each of the candidate columns that did not have a solution value greater than the threshold, solving the unit commitment problem with a second demand value, wherein the second demand value is different from the first demand value.

In one example, the restricted master linear problem comprises:

min c'λ
s.t. A'λ≥b :θ*
eλ=1 :α*
λ≥0;

wherein the corresponding dual problem comprises:

max α
s.t. θ(A'−b)+α≤c' :λ*
θ≥0;

wherein a pricing problem associated with the master linear problem and the corresponding dual problem comprises:

$$\min_j c_j - \theta^*(A_j - b) - \alpha^* \Leftrightarrow \min_{x\in X}(c - \theta^*(A-b))x - \alpha^* \equiv z^* - \alpha^*;$$

and wherein e is the vector of ones and λ*, θ*, α* are the optimal primal and dual solutions.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

In another embodiment an article of manufacture is provided, comprising: at least one tangible computer usable medium having a computer readable program code logic tangibly embodied therein to execute at least one machine instruction in a processing unit for solving a stochastic unit commitment problem using a branch-cut-price algorithm, said computer readable program code logic, when executing, performing the following steps: iteratively generating a plurality of candidate columns by operating on a restricted master linear problem and a corresponding dual problem; and solving a pricing problem for the candidate columns; wherein the generation of the candidate columns includes: maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list; at each iteration of the candidate column generation using a weighted dual solution $\bar{\theta}$ to solve the pricing problem;

wherein $\bar{\theta} = w\theta^* + w_1\theta_1 + \ldots + w_k\theta_k$, $w \geq 0$, $w_i \geq 0$, $i=1,\ldots,k$, $w + \Sigma_{i=1,\ldots,k} w_i = 1$, and wherein $\theta_1, \ldots, \theta_k$ corresponds to the dual solutions that are in the list.

In one example, the restricted master linear problem comprises:

min c'λ
s.t. A'λ≥b :θ*
eλ=1 :α*
λ≥0;

wherein the corresponding dual problem comprises:

max α
s.t. θ(A'−b)+α≤c' :λ*
θ≥0;

wherein the pricing problem comprises:

$$\min_j c_j - \theta^*(A_j - b) - \alpha^* \Leftrightarrow \min_{x \in X}(c - \theta^*(A - b))x - \alpha^* \equiv z^* - \alpha^*;$$

and wherein e is the vector of ones and λ*, θ*, α* are the optimal primal and dual solutions.

In another example, the generation of the candidate columns includes: maintaining the list of k best lower bounds; wherein the corresponding dual solutions are $(\theta_1, \alpha_1)$, $(\theta_2, \alpha_2), \ldots, (\theta_k, \alpha_k)$ such that $z_1 \leq z_2 \leq \ldots \leq z_k$ where $z_i$, $i=1,\ldots,k$ are the optimal value of the pricing problem when $\theta_i$ is used; as the column generation proceeds, checking the lower bound at each iteration, and, if the checked lower bound is better than at least one of the lower bounds in the list, inserting the checked lower bound into the appropriate position in the list; at each iteration of the candidate column generation using a weighted dual solution $\bar{\theta}$ to solve the pricing problem;

wherein $\bar{\theta} = w\theta^* + w_1\theta_1 + \ldots + w_k\theta_k$, $w \geq 0$, $w_i \geq 0$, $i=1,\ldots,k$, $w + \Sigma_{i=1,\ldots,k} w_i = 1$ and wherein $\theta_1, \ldots, \theta_k$ corresponds to the dual solutions that are in the list.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

In another embodiment an article of manufacture is provided, comprising: at least one tangible computer usable medium having a computer readable program code logic tangibly embodied therein to execute at least one machine instruction in a processing unit for solving a stochastic unit commitment problem using a branch-cut-price algorithm, said computer readable program code logic, when executing, performing the following steps: iteratively generating in a sequential manner a plurality of candidate columns by operating on a restricted master linear problem and a corresponding dual problem; and solving, in parallel for at least two of the candidate columns, a pricing problem.

In one example, the restricted master linear problem comprises:

min c'λ
s.t. A'λ≥b :θ*
eλ=1 :α*
λ≥0;

wherein the corresponding dual problem comprises:

max α
s.t. θ(A'−b)+α≤c' :λ*
θ≥0;

wherein the pricing problem comprises:

$$\min_j c_j - \theta^*(A_j - b) - \alpha^* \Leftrightarrow \min_{x \in X}(c - \theta^*(A - b))x - \alpha^* \equiv z^* - \alpha^*;$$

and wherein e is the vector of ones and λ*, θ*, α* are the optimal primal and dual solutions.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

In another embodiment an article of manufacture is provided, comprising: at least one tangible computer usable medium having a computer readable program code logic tangibly embodied therein to execute at least one machine instruction in a processing unit for solving a stochastic unit commitment problem using a branch-cut-price algorithm, said computer readable program code logic, when executing, performing the following steps: iteratively generating a plurality of candidate columns by operating on a restricted master linear problem and a corresponding dual problem, wherein each of the candidate columns is generated based upon a first demand value; and for x number of the iterations of the candidate generation, wherein x is an integer: maintaining each of the candidate columns that had a solution value greater than a threshold; and for each of the candidate columns that did not have a solution value greater than the threshold, solving the unit commitment problem with a second demand value, wherein the second demand value is different from the first demand value.

In one example, the restricted master linear problem comprises:

min c'λ
s.t. A'λ≥b :θ*
eλ=1 :α*
λ≥0;
wherein the corresponding dual problem comprises:
max α
s.t. θ(A'−b)+α≤c' :λ*
θ≥0;
wherein a pricing problem associated with the master linear problem and the corresponding dual problem comprises:

$$\min_j c_j - \theta^*(A_j - b) - \alpha^* \Leftrightarrow \min_{x \in X}(c - \theta^*(A-b))x - \alpha^* \equiv z^* - \alpha^*;$$

and
wherein e is the vector of ones and λ*, θ*, α* are the optimal primal and dual solutions.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

In another embodiment a method for solving a stochastic unit commitment problem using a branch-cut-price algorithm is provided, the method comprising: iteratively generating a plurality of candidate columns by operating on a restricted master linear problem and a corresponding dual problem; and solving a pricing problem for the candidate columns; wherein the generation of the candidate columns includes: maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list; at each iteration of the candidate column generation using a weighted dual solution $\bar{\theta}$ to solve the pricing problem;
wherein $\bar{\theta}=w\theta^*+w_1\theta_1+\ldots+w_k\theta_k$, w≥0, $w_i$≥0, i=1,...,k, $w+\Sigma_{i=1,\ldots,k}w_i=1$, and wherein $\theta_1,\ldots,\theta_k$ corresponds to the dual solutions that are in the list.

In one example, the restricted master linear problem comprises:

min c'λ
s.t. A'λ≥b :θ*
eλ=1 :α*
λ≥0;
wherein the corresponding dual problem comprises:
max α
s.t. θ(A'−b)+α≤c' :λ*
θ≥0;
wherein the pricing problem comprises:

$$\min_j c_j - \theta^*(A_j - b) - \alpha^* \Leftrightarrow \min_{x \in X}(c - \theta^*(A-b))x - \alpha^* \equiv z^* - \alpha^*;$$

and
wherein e is the vector of ones and λ*, θ*, α* are the optimal primal and dual solutions.

In another example, the generation of the candidate columns includes: maintaining the list of k best lower bounds; wherein the corresponding dual solutions are $(\theta_1,\alpha_1)$, $(\theta_2,\alpha_2),\ldots,(\theta_k,\alpha_k)$ such that $z_1 \le z_2 \le \ldots \le z_k$ where $z_i$, i=1,...,k are the optimal value of the pricing problem when $\theta_i$ is used; as the column generation proceeds, checking the lower bound at each iteration, and, if the checked lower bound is better than at least one of the lower bounds in the list, inserting the checked lower bound into the appropriate position in the list; at each iteration of the candidate column generation using a weighted dual solution $\bar{\theta}$ to solve the pricing problem;
wherein $\bar{\theta}=w\theta^*+w_1\theta_1+\ldots+w_k\theta_k$, w≥0, $w_i$≥0, i=1,...,k, $w+\Sigma_{i=1,\ldots,k}w_i=1$, and wherein $\theta_1,\ldots,\theta_k$ corresponds to the dual solutions that are in the list.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

In another embodiment a method for solving a stochastic unit commitment problem using a branch-cut-price algorithm is provided, the method comprising: iteratively generating in a sequential manner a plurality of candidate columns by operating on a restricted master linear problem and a corresponding dual problem; and solving, in parallel for at least two of the candidate columns, a pricing problem.

In one example, the restricted master linear problem comprises:

min c'λ
s.t. A'λ≥b :θ*
eλ=1 :α*
λ≥0;
wherein the corresponding dual problem comprises:
max α
s.t. θ(A'−b)+α≤c' :λ*
θ≥0;
wherein the pricing problem comprises:

$$\min_j c_j - \theta^*(A_j - b) - \alpha^* \Leftrightarrow \min_{x \in X}(c - \theta^*(A-b))x - \alpha^* \equiv z^* - \alpha^*;$$

and
wherein e is the vector of ones and λ*, θ*, α* are the optimal primal and dual solutions.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

In another embodiment a method for solving a stochastic unit commitment problem using a branch-cut-price algorithm is provided, the method comprising: iteratively generating a plurality of candidate columns by operating on a restricted master linear problem and a corresponding dual problem, wherein each of the candidate columns is generated based upon a first demand value; and for x number of the iterations of the candidate generation, wherein x is an integer: maintaining each of the candidate columns that had a solution value greater than a threshold; and for each of the candidate columns that did not have a solution value greater than the threshold, solving the unit commitment problem with a second demand value, wherein the second demand value is different from the first demand value.

In one example, the restricted master linear problem comprises:

min $c'\lambda$
s.t. $A'\lambda \geq b$ : $\theta^*$
$e\lambda = 1$ : $\alpha^*$
$\lambda \geq 0$;

wherein the corresponding dual problem comprises:

max $\alpha$
s.t. $\theta(A'-b)+\alpha \leq c'$ : $\lambda^*$
$\theta \geq 0$;

wherein a pricing problem associated with the master linear problem and the corresponding dual problem comprises:

$$\min_j c_j - \theta^*(A_j - b) - \alpha^* \Leftrightarrow \min_{x \in X}(c - \theta^*(A - b))x - \alpha^* \equiv z^* - \alpha^*;$$

and wherein e is the vector of ones and $\lambda^*$, $\theta^*$, $\alpha^*$ are the optimal primal and dual solutions.

In another example, the stochastic unit commitment problem relates to energy.

In another example, the stochastic unit commitment problem relates to power generation.

In another example, each of the candidate columns comprises a schedule for a respective power generator.

In another example, the pricing problem is solved for each of a plurality of power generators.

In another example, the steps are carried out in the order recited.

The smart grid attempts to predict and wisely react to the behaviors and actions of all agents in the electric power market—organizers, generators, suppliers, and consumers—with the hope of efficiently delivering reliable and sustainable electricity services. It will be operated under highly dynamic regimes, combining modern ideas such as large-scale renewable generation, energy storage, deregulated power market, demand response, load shifting, future power contracts, and power purchase agreements, etc. The electric power in the smart grid will have to be cleared in real time with smart planning and operational decisions that optimize social welfare.

The unit commitment problem lies at the core of such planning and operational decisions faced by independent system operators (ISOs), regional transmission organizations (RTOs), and utility companies. The day-ahead market in the United States utilizes the unit commitment (UC) to identify a unit commitment schedule and computes day-ahead locational marginal prices (LMPs). In one example, unit commitment is the problem of finding an optimal up and down schedule and corresponding generation amounts for a set of generators over a planning horizon so that total cost of generation and transmission is minimized, and a set of constraints, such as demand requirement, upper and lower limits of generation, minimum up/down time limits, ramp up/down constraints, transmission constraints, and so forth, is observed. The output of this is an optimal schedule for generators in a twenty four hour time horizon. We refer to FERC (2006), the entire contents and disclosure of which is incorporated by reference as if fully set forth herein, for the definition of "(day-ahead) unit commitment".

There are several points that conventional practice is missing and that need to be handled in the very near future. One such point is the integration of renewable energy into the grid. To achieve significant integration of renewable energy sources (e.g., wind power), advanced optimization techniques have to be developed that addresses the intermittent and stochastic nature of such sources. This requires more algorithmic advancement that uses high-performance and parallel computing environments. One goal is to solve a practical instance of these two problems together, considering other relevant issues such as "demand response" and "energy storage."

In this disclosure, we give a generic formulation for the unit commitment problem below. We also give an extension of this formulation to handle intermittent renewable generation.

Indices and Sets:
$i \in I$ generators
$t \in \{1, \ldots, T\}$ time periods

Data:
$S_i(\bullet)$ startup cost function of unit i
$H_i(\bullet)$ shutdown cost function of unit i
$f_i(\bullet)$ generation cost function of unit i
$(Q_i, q_i)$ maximum and minimum amounts for units i's offer
$(R_i, r_i)$ ramp-up and ramp-down amounts for unit i
$(L_i, l_i)$ minimum up and down times for unit i
$d_t$ load at time period t Decision Variables:
$g_{it}$ generation provided by unit i at time period t
$u_{it}$ binary variable indicating if unit i is on at time period t
$\bar{u}_{it}$ vector of $u_{it}$ variables. $\bar{u}_{it} \equiv (u_{i\tau})$, $\tau = t - l_i + 1, \ldots, t$.

Formulation:

$$\min_{g,u} \sum_{t=1}^{T} \sum_{i \in I} S_i(\bar{u}_{it}) + H_i(\bar{u}_{it}) + f_i(g_{it}) \tag{1a}$$

$$\text{s.t.} \sum_{i \in I} g_{it} \geq d_t, t = 1, \ldots, T, \tag{1b}$$

$$q_i u_{it} \leq g_{it} \leq Q_i u_{it}, i \in I, t = 1, \ldots, T, \tag{1c}$$

$$g_{it} - g_{i,t-1} \leq R_i, i \in I, t = 1, \ldots, T, \tag{1d}$$

$$g_{i,t-1} - g_{it} \leq r_i, i \in I, t = 1, \ldots, T, \tag{1e}$$

$$u_{it} - u_{i,t-1} \leq u_{i\tau}, \tau \in \{t+1, \ldots, \min\{t+L_i, T\}\}, \tag{1f}$$
$$i \in I, t = 1, \ldots, T,$$

$$u_{i,t-1} - u_{it} \leq 1 - u_{i\tau}, \tau \in \{t+1, \ldots, \min\{t+l_i, T\}\}, \tag{1g}$$
$$i \in I, t = 1, \ldots, T,$$

$$u_{it} \in \{0, 1\}, g_{it} \geq 0, i \in I, t = 1, \ldots, T. \tag{1h}$$

Objective function (1a) is the total cost of generation summed over all time periods. Cost of generation includes startup cost, shutdown cost, and fuel cost. Fuel cost is a nonlinear function of generation level, which is not necessarily convex. Constraint (1b) requires total generation be greater than the load. Constraint (1c) has two functions: If the unit is down, it forces the generation to be zero; and, if the unit is up, it arranges the generation level to be between the upper and lower limits of the generator. Constraints (1d) and (1e) handle ramp-up and ramp-down limits. Constraint (1f) is for minimum up time and constraint (1g) is for minimum down time requirement. Finally constraint (1h) puts binary and nonnegativity requirements.

Startup (shutdown) cost is a step function that takes its highest step value when the unit has been down (up) for more than or equal to $l_i(L_i)$ time periods. The step values decrease proportionally to zero when the unit has been up (down) at the last time period.

Minimum up/down time constraints are sometimes formulated as $$\sum_{\tau=\max\{1,t-L_i+1\}}^{t} s_{i\tau} \leq u_{it}, i \in I, t = 1, \ldots, T \quad (2a)$$

$$\sum_{\tau=t+1}^{\min\{T,t+l_i\}} s_{i\tau} \leq 1 - u_{it}, i \in I, t = 1, \ldots, T \quad (2b)$$

$$s_{it} \geq u_{it} - u_{i,t-1}, i \in I, t = 1, \ldots, T \quad (2c)$$

$$s_{it} \in \{0, 1\}, i \in I, t = 1, \ldots, T \quad (2d)$$

If the set of constraints (1f)-(1g) is used to model the minimum up/down time constraints, there is no need to introduce variable $s_{it}$ in model (1). Rajan and Takriti (2005) claims that constraints (2a)-(2d) model the minimum up/down time polytope.

The academic literature on the unit commitment problem dates back to the 1960s. Enumerating all possible combinations of generators and choosing the one that meets all the system constraints and that has the least cost may solve the problem. Kerr, et al. (1966) is one of the first studies that reduced the unit commitment problem to mathematical terms. An integer programming approach proposed by Dillon, et al. (1978) was one of the earliest optimization-based approaches to the unit commitment problem. These authors address the unit commitment problem of hydro-thermal systems with reserve requirements. It was one of the earliest papers that can solve real life problems with 20 units. These authors developed two sets of valid inequalities that were globally valid to the problem and used these inequalities in the branch-and-bound algorithm. The dynamic programming approach developed by Snyder, et al. (1987) was one of the earliest successful dynamic programming algorithms. The algorithm featured a classification of units so as to reduce the number of states. These authors addressed the problem at San Diego Gas & Electric System with 30 generators. Birge and Takriti (2000) realized that the demand constraint in the problem coupled all the units in the problem, which would otherwise decompose into separate small problems for each unit. These authors developed a Lagrangian relaxation algorithm based on relaxing the demand constraint. They also proposed a refining procedure that took Lagrangian solutions and produced feasible solutions to the problem. Expert systems (Quyang and Shahidehpour 1990), fuzzy logic (Saneifard, et al. 1997), meta-heuristic algorithms (Mantawy, et al. 1999), and ant colony systems (Huang 2001) are among the other approaches that have been applied to the unit commitment problem.

Surveys by Sheble and Fand (1999) and by Padhy (2004) review the academic literature on the unit commitment problem, and the book by Wood and Wollenburh (1996) addresses several operational and planning problems in the energy industry, including the unit commitment problem.

In practice, unit commitment is solved either in a centralized or decentralized manner [FERC 2006, Federal Energy Regulatory Commission, "Security-Constrained Economic Dispatch: Definition, Practices, Issues and Recommendations—A Report to Congress Regarding the Recommendations of Regional Joint Boards For the Study of Economic Dispatch Pursuant to Section 223 of the Federal Power Act as Added by Section 1298 of the Energy Policy Act of 2005," Jul. 31, 2006, http://www.ferc.gov/industries/electric/indus-act/joint-boards/final-cong-rpt.pdf]. In western and southern regions, most small utility companies generate and distribute their power in a decentralized manner, with California ISO (CAISO) in the west and ERCOT (Electric Reliability Council of Texas) in the south as two exceptions. In the Midwest, PJM (Pennsylvania, New Jersey, Maryland (ISO: Independent System Operator)) and MISO (Midwest ISO (Independent System Operator), and in Northeast, NYISO, and ISO-NE handle most of the power system planning and transmission in a centralized manner. All these organizations work in a centralized manner to solve their unit commitment and economic dispatch problems [FERC 2006][R. Mukerji, 2010. "NYISO Day-ahead unit commitment design," Technical Conference on Unit Commitment Software, Federal Energy Regulatory Commission, Jun. 2, 2010][A. Ott, "Unit commitment in PJM", Technical Conference on Unit Commitment Software, Federal Energy Regulatory Commission, Jun. 2, 2010][M. Rothleder, "Unit commitment in the CAISO market", Technical Conference on Unit Commitment Software, Federal Energy Regulatory Commission, Jun. 2, 2010].

Specifically, unit commitment practices in PJM involve more than 600 utility companies in 13 states [A. Ott, 2010]. It manages 1210 generators with a total capacity of 164,905 MW, and it faces a peak load of 144,644 MW. PJM takes around 50,000 hourly demand bids from consumers one day ahead of the planning horizon. It then solves the day-ahead unit commitment problem considering around 10,000 contingencies, and publishes generation schedules for the companies and LMPs for the consumers. Consumers revise their bids based on the prices, and submit their final bids. Around 10,000 demand bids are submitted, and 8,700 of them are considered eligible. PJM updates the generation schedules and redoes its security analysis based on the final bids. In real-time, PJM solves a one-period security constrained unit commitment problem using a full transmission model and turns on (off) some peaker units if the total planned amount that can be transmitted securely falls behind (exceeds) the demand.

ISOs have typically used Lagrangian relaxation to solve their unit commitment problems until recently, and have now typically switched to general-purpose integer programming solvers [R. Mukerji, 2010][A. Ott, 2010][M. Rothleder, "Unit commitment in the CAISO market", Technical Conference on Unit Commitment Software, Federal Energy Regulatory Commission, Jun. 2, 2010]. For example, the IBM ILOG CPLEX Mixed Integer Optimizer is one of the few solvers that is able to handle long planning horizons for large power systems.

Conventional industrial solutions have been traditionally dominated by the Lagrangian relaxation methods, and only recently they have switched to general-purpose integer programming solvers. Academic solutions are more diverse, but they are typically demonstrated on much smaller IEEE bus cases than the real life scenarios. There are typically a number of limitations to conventional solutions: (1) the inability to solve large-scale real life power system operating problems in a given time, (2) the sub-optimality of the solutions—globally optimal solutions are seldom attained, (3) the lack of guarantee of convergence to a feasible solution, (4) limited consideration of contingency scenarios (typically focusing on N–1 but not on N–x contingencies), (5) the use of deterministic formalism for handling unpredictable loading and generation, and (6) the lack of support for real-time operation.

These limitations have made conventional power systems typically operate very conservatively with excessive margins in order to handle all types of un-modeled uncertainties. The future needs of the power system such as increasing integration of renewable energy resources and growing demand for electricity will only exacerbate this problem. These excessive margins will substantially limit the efficiency and capacity of the power grid if the limitations are not addressed properly.

Reference will now be made to Stochastic Unit Commitment and Scenario Reduction. In one example, a stochastic programming approach is used to address the uncertainties in the load and intermittency of renewables. It is assumed that the uncertainty evolves as a discrete time stochastic process with a finite probability space. The information structure is represented as a rooted scenario tree where the nodes n (n∈N) in level t (t∈T) of the scenario tree constitute the states of the world that can be distinguished by the information available up to time period t (Ahmed, et al. (2003), Singh, et al. (2009)). The set of leaf nodes, $N_L$ ($N_L \subset N$), contains the nodes without any successor. The root node is the node without any predecessor. In general, $n(\tau) \in N$ represents the $\tau^{th}$ predecessor of node n. The level of the root node is zero, and in general the level of a node, $t_n$, is defined such that $n(t_n)$ is the root node. The tree has a depth of T, and all leaf nodes have a level of T. By convention, n(0) is the node n itself, and $n(\tau)$, $\tau > t_n$, is an empty set.

The root node has an occurrence probability of one. For each node n∈N, $\pi_n$ denotes the probability that the corresponding state of the world occurs given that its predecessor, n(1), has occurred; and $p_n$ denotes the unconditional probability that the corresponding state occurs, i.e., $p_n = \Pi_{\tau=0}^{t_n-1} \pi_{n(\tau)}$. There is a one-to-one matching between the leaf nodes of the scenario tree and the scenarios. Given a leaf node, $n \in N_L$, a T-tuple [n(T), n(T−1), . . . , n(1), n] represents a scenario with probability of occurrence equal to $p_n$. Two scenarios sharing the same state of the world at time periods $1, \ldots, \tau$, for some $\tau < T$, have to observe the same set of decision variables in the optimization model, in order to make sure that the model does not cheat by foreseeing (anticipating) the future. Using only a single set of decision variables for each node guarantees such a non-anticipativity property, and yet keeps the model size small as compared to using a separate set of decision variables for each scenario and for each time period and setting the variables equal to each other (Tahiti, et al. (2000), Lulli and Sen (2004)).

The stochastic unit commitment models is an extension of model (1), where nodes n in the scenario tree replace the time periods t in the deterministic model (1).

Formulation:

$$\min_{g,u,s} \sum_{n \in N} p_n \sum_{i \in I} S_i(\bar{u}_{in}) + H_i(\bar{u}_{in}) + F_i(g_{in}) \quad (3a)$$

$$\text{s.t.} \sum_{i \in I} g_{in} \geq d_n, n \in N, \quad (3b)$$

$$q_i u_{in} \leq g_{in} \leq Q_i u_{in}, i \in I, n \in N, \quad (3c)$$

$$s_{in} \geq u_{in} - u_{i,n(1)}, i \in I, n \in N \quad (3d)$$

$$g_{in} - g_{i,n(1)} \leq R_i, i \in I, n \in N \quad (3e)$$

$$g_{i,n(1)} - g_{in} \leq r_i, i \in I, n \in N \quad (3f)$$

$$\sum_{\tau=0}^{L_i-1} s_{i,n(\tau)} \leq u_{in}, i \in I, n \in N \quad (3g)$$

$$\sum_{\tau=1}^{l_i-1} s_{i,n(\tau)} \leq 1 - u_{i,n(l_i)}, i \in I, n: n(l_i) \in N \quad (3h)$$

$$\sum_{\tau=1}^{l_i-1-p} s_{i,n(\tau)} \leq 1 - u_{i,n(l_i-p)}, i \in I, n \in N_L p \in \{1, \ldots, l_i - 1\} \quad (3i)$$

$$u_{in} \in \{0, 1\}, s_{in} \in \{0, 1\}, g_{in} \geq 0 \quad (3j)$$

Reference will now be made to a Branch-Cut-Price Algorithm. In this example, the branch-cut-price algorithm relies on performing a branch-and-cut algorithm on a column-based reformulation of the original problem. Column-based formulations often have tighter linear programming (LP) relaxations, hence yielding a smaller branch-and-bound tree. On the negative side, a column-based formulation has an exponential number of columns that are typically impractical to handle simultaneously. Delayed column generation is an effective method to handle this drawback. One starts with a small number of columns that are sufficient to form a feasible formulation and adds additional columns as necessary, until no more columns that can improve the LP relaxation remain. For more background on branch-cut-price algorithms see the surveys by Barnhart, et al. (1998) and Lubbecke and Desrosiers (2005), and the book by Desaulniers, et al. (2005).

We develop a branch-cut-price algorithm for model (3). Specifically, we construct a new column-based reformulation and a column-generation algorithm, develop several enhancements such as weighted column generation, a new lower bounding scheme, stabilization and a combined subgradient algorithm, provide two primal heuristics and two cut-generation schemes, and present an efficient parallelization of the algorithm.

With reference now to Column-based Reformulation, a key element in a branch-cut-price algorithm is the column-based reformulation as it affects the size of the branch-and-bound tree that the algorithm explores. It is important as the tighter the LP relaxation of the column-based reformulation, the fewer the number of nodes in the tree. There are various reformulation strategies developed for the stochastic integer programs, which can be classified as scenario decomposition (Lulli and Sen (2004)), nodal decomposition (Singh, et al. (2004), complete decomposition, and geographical decomposition (Shiina and Birge (2004), Silva and Wood (2007)). The first three use the fact that the problem decomposes into scenario subproblems, while the last one uses the loosely coupled structure of the original deterministic problem. After obtaining a preliminary test using each of the decomposition algorithms, we use the geographical decomposition.

Given i∈I, let $(g, u, s)_{i \in I, n \in N}^k$, $k \in K_i$ enumerate the feasible points of the constraint set (3c)-(3j). Substituting $$g_{in} = \sum_{k \in K_i} \lambda^k g_{in}^k \quad n \in N, i \in I,$$

$$u_{in} = \sum_{k \in K_i} \lambda^k u_{in}^k \quad n \in N, i \in I,$$

$$s_{in} = \sum_{k \in K_i} \lambda^k s_{in}^k \quad n \in N, i \in I,$$

$$\sum_{k \in K_i} \lambda^k = 1 \quad i \in I,$$

$$\lambda^k \in \{0, 1\} \quad k \in K_i, i \in I,$$

in formulation (3), yields the column-based reformulation:

$$\min_{\lambda} \sum_{i \in I} \sum_{k \in K_i} \lambda^k \sum_{n \in N} p_n(S_i(\bar{u}_{in}^k) + H_i(\bar{u}_{in}^k) + f_i(g_{in}^k)) \quad (4a)$$

$$s.t. \sum_{i \in I} \sum_{k \in K_i} \lambda^k g_{in}^k \geq d_n, n \in N, \quad (4b)$$

$$\sum_{k \in K_i} \lambda^k = 1, i \in I, \quad (4c)$$

$$\lambda^k \in \{0,1\} k, \in K_i, i \in I. \quad (4d)$$

We are interested in the LP-relaxation of model (4). This LP-relaxation is what we are interested throughout the following discussions, and is called master linear program (MLP). It is impractical to enumerate all columns in $K_i$ (that is, it is impractical to explicitly handle the MLP as it has an exponential number of columns). We start with a subset of the columns, $K'_i \subset K_i$, and dynamically generate columns that have negative reduced cost. We continue the column generation process until no more columns with negative reduced cost remains. Let $\theta_n$ and $\alpha_i$ be the reduced costs associated with constraints (4b) and (4c) of LP-relaxation of model (4). Then, reduced cost of variable $\lambda^k$, $k \in K_i$ is $\Sigma_{n \in N} p_n(S_i(\bar{u}_{in}^k) + H_i(\bar{u}_{in}^k) + f_i(g_{in}^k)) - \theta_n g_{in}^k - \alpha_i$. We solve model (5) below to find the column with the most negative cost. If that column has nonnegative reduced cost, we stop. Otherwise, we add that column to model (4), and repeat the column generation process.

$$\min_{g,u,s} \sum_{n \in N} p_n \sum_{i \in I} (S_i(\bar{u}_{in}^k) + H_i(\bar{u}_{in}^k) + f_i(g_{in}^k)) - \theta_n g_{in}^k - \alpha_i \quad (5a)$$

$$s.t. (3c) - (3j). \quad (5b)$$

As described, in one embodiment, the whole column-generation algorithm (or also called branch-price algorithm) is based on working with a restricted version of the MLP, called RMLP, that has only a small number of columns. The aim is to investigate if we have left out "important" columns or not. The iterative procedure described herein makes sure that, at the end, no "important" columns are left out. Sometimes, it is not practical to wait until the end of the algorithm (which would make sure that no "important" column is left out), but stop somewhere. To determine where to stop, we may use the upper and lower bounds on the MLP (the original problem we are dealing with), and once the lower and upper bounds are close enough, we stop. We may determine these lower and upper bounds using some info from the RMLP.

Reference will now be made to Weighted Column Generation.

$$\min c'\lambda$$

$$s.t. A'\lambda \geq b : \theta^*$$

$$e\lambda = 1 : \alpha^*$$

$$\lambda \geq 0 \quad (6)$$

$$\max \alpha$$

$$s.t. \theta(A'-b) + \alpha \leq c' : \lambda^*$$

$$\theta \geq 0 \quad (7)$$

Let model (6) be the restricted master linear problem (RMLP) and model (7) be the corresponding dual problem where e is the vector of ones, and let $\lambda^*$, $\theta^*$, $\alpha^*$ be the optimal primal and dual solutions. At an iteration of a conventional column generation algorithm, we use the current optimal dual solutions, $\theta^*, \alpha^*$ to check for the next candidate column for the RMLP (similarly candidate row for the dual RMLP), and solve the following pricing problem over all columns for j:

$$\min_j c_j - \theta^*(A_j - b) - \alpha^* \Leftrightarrow \min_{x \in X}(c - \theta^*(A-b))x - \alpha^* \equiv z^* - \alpha^* \quad (8)$$

We add the column if its reduced cost in the RMLP is negative, i.e., $z^* - \alpha^* < 0$, (similarly if it is a violating constraint for the dual RMLP), and we stop otherwise. The optimal solution to the RMLP, $c'\lambda^*$, or to the dual RMLP, $\alpha^*$, is an upper bound for the original master linear problem (MLP). Noting that for a given $\theta^*$, we have $z^* \leq c_j - \theta^*(A_j - b)$, $\forall j$, the vector $(\theta^*, z^*)$ forms a feasible solution to the original MLP, and thus $z^*$ is a lower bound for the original MLP.

In an example weighted column generation, we keep a list of k best lower bounds and corresponding dual solutions, $(\theta_1, \alpha_1), (\theta_2, \alpha_2), \ldots, (\theta_k, \alpha_k)$, such that $z_1 \leq z_2 \leq \ldots \leq z_k$, where $z_i$, i=1, ..., k are the optimal value of pricing problem (8) when $\theta_i$ is used instead of $\theta^*$. As the column generation proceeds, we check the lower bound at each iteration, and, if it is better than one of the lower bounds in the list, we insert it into the appropriate position in the list. At an iteration of the algorithm we use weighted dual solutions, $\bar{\theta}$, instead of the current dual solution, $\theta^*$, to solve pricing problem (8), where $\bar{\theta} = w\theta^* + w_1\theta_1 + \ldots + w_k\theta_k$, $w \geq 0$, $w_i 0$, i=1, ..., k, $w + \Sigma_{i=1,\ldots,k} w_i = 1$.

In one example, each column may be a feasible schedule for a generator. In another example, models (6) and (7) may not be easily (or even possibly) parallelized. In another example, pricing problem (8) may be parallelized. In another example, models (6) and (7) may be used to add another column and pricing problem (8) may be used to find another feasible schedule. In another example, pricing problem (8) may be used to solve for each generator (e.g., each generator j).

We prove that this weighted column generation terminates in a finite number of steps as long as the original column generation algorithm does so.

Referring now to Table 1, below, the efficiency of weighted column generation according to one example is shown.

TABLE 1

| Problem Instance | base (primal simplex) | | | base (barrier) | | | weight 3 | | | weight 9 | | |
|---|---|---|---|---|---|---|---|---|---|---|---|---|
| | # iter. | run time | serial frac. (%) | # iter. | run time | serial frac. (%) | # iter. | run time | serial frac. (%) | # iter. | run time | serial frac. (%) |
| 6-30-32-1 | 146 | 68 | 2.0 | 151 | 173 | 59 | 126 | 54 | 1.91 | 173 | 70 | 2.47 |
| 6-30-32-2 | 487 | 240 | 2.8 | 489 | 760 | 68 | 208 | 102 | 2.3 | 177 | 85 | 2.4 |
| 6-30-32-3 | 137 | 84 | 2.4 | 138 | 256 | 66 | 123 | 76 | 2.7 | 167 | 97 | 3.2 |
| 7-30-32-1 | 451 | 272 | 3.7 | 453 | 3357 | 91 | 265 | 169 | 2.9 | 208 | 127 | 2.4 |
| 7-30-32-2 | 764 | 507 | 4.0 | 777 | 4845 | 89 | 341 | 232 | 3.2 | 242 | 162 | 2.6 |
| 7-30-32-3 | 360 | 301 | 4.0 | 311 | 5651 | 95 | 252 | 214 | 3.8 | 195 | 160 | 2.9 |
| 9-30-32-1 | 1435 | 1618 | 12 | 1391 | 383k | 99 | 585 | 650 | 5.8 | 412 | 445 | 4.3 |
| 9-30-32-2 | 890 | 1141 | 8.0 | 910 | 177k | 99 | 370 | 466 | 5.2 | 257 | 340 | 4.0 |
| 9-30-32-3 | 1077 | 1788 | 17 | 1053 | 399k | 99 | 442 | 686 | 10 | 340 | 526 | 6.0 |
| 12-30-32-1 | 3324 | 8911 | 30 | na | na | na | 1033 | 2503 | 19 | 582 | 1251 | 9.5 |
| 12-30-32-2 | 2388 | 7495 | 27 | na | na | na | 698 | 1884 | 14 | 377 | 941 | 7.3 |
| 12-30-32-3 | 2259 | 7078 | 28 | na | na | na | 700 | 2470 | 24 | 418 | 1333 | 15 |

Of note, in Table 1 we solve ISO model with linear objective. The base portion gives the running time statistics for the algorithm when we use primal simplex and barrier methods to solve the RMLP, respectively. The "weight 3'" and "weight 9'" gives the statistics for the algorithm when we use primal simplex to solve the RMLP and weight the dual solutions corresponding to 3 and 9 best dual solutions. The three columns under each portion gives the number of iterations that the algorithm takes, total running time, and the percentage of the serial time of the algorithm.

Proposition: The weighted column generation algorithm described above terminates in a finite number of steps as long as the original column generation algorithm terminates so.

Proof: We show that if an iteration of the weighted column generation algorithm does not produce a candidate column for the RMLP, the lower bound estimate at the corresponding iteration improves by at least a fraction of the distance between the upper and lower bound values. We call such iterations improvement iterations. Let $\bar{x}$ be the column generated by the pricing problem (8) using $\bar{\theta}$. In an improvement iteration, no column with a positive reduced cost is produced, i.e., $(c-\theta^*(A-b))\bar{x}-\alpha^* \geq 0$. We also recall that $z_1 \leq z_2 \leq \ldots \leq z_k$. Expanding on $\bar{z}$, we get:

$$\bar{z} = \min_{x \in X}(c - \bar{\theta}(A-b))x =$$
$$(c - \bar{\theta}(A-b))\bar{x} = w(c - \theta^*(A-b))\bar{x} + w_1(c - \theta_1(A-b))\bar{x} +$$
$$\ldots + w_k(c - \theta_k(A-b))\bar{x} \geq w(c - \theta^*(A-b))\bar{x} +$$
$$w_1 \min_{x \in X}(c - \theta_1(A-b))x + \ldots + w_k \min_{x \in X}(c - \theta_k(A-b))x \geq$$
$$w\alpha^* + w_1 z_1 + \ldots + w_k z_k \geq w\alpha^* + (1-w)z_1 = z_1 + w(\alpha^* - z_1).$$

This shows that in an improvement iteration, the distance between the upper bound and the new lower bound becomes less than $100(1-w)$% of the distance between the upper bound and the smallest lower bound. Thus after at most $k$ improvement iterations, the distance between the upper bound and the smallest lower bound decreases by at least $100w$%. By a similar argument, after at most $km$ improvement iterations the distance between the upper bound and the smallest lower bound becomes at most $100(1-w)^m$%. Even if we assume that in weighted column generation the lower bounds increase only in improvement iterations, for a sufficiently large number of iterations the gap between the upper bound and the smallest lower bound (and thus the largest lower bound) becomes less than any prespecified distance.

$$\bar{z} =$$
$$\min_{x \in X}(c - \bar{\theta}A)x = \min_{x \in X}(w(c - \theta^*A)x + w_1(c - \theta_1 A)x + \ldots + w_k(c - \theta_k A)x) \geq$$
$$w\min_{x \in X}(c - \theta^*A)x + w_1 \min_{x \in X}(c - \theta_1 A)x + \ldots + w_k \min_{x \in X}(c - \theta_k A)x \geq$$
$$wz^* + w_1 z_1 + \ldots + w_k z_k.$$

By a similar argument, $$\bar{\theta}b + \bar{z} = \bar{z} + w\theta^*b + w_1\theta_1 b + \ldots + w_k w_k$$
$$\geq w(\theta^*b + z^*) + w_1(\theta_1 b + z_1) + \ldots + w_k(\theta_k b + z_k).$$

Thus, if there was an improvement of lower bound in the original column generation (using $\theta^*$), the weighted column generation realizes a fraction of such improvement. But, on the plus side, if the original column generation would produce a terribly small lower bound, the weighted column generation averages this small lower bound by the best k lower bounds and does not suffer from such oscillations.

Reference will now be made to combining column generation with a subgradient algorithm.

Barahona and Anbil (2000) develops an efficient subgradient algorithm and Barahona and Jensen (1998) combines subgradient algorithm with column generation and obtain promising results. In this section we combine the volume algorithm of Barahona and Anbil (2000) with the column generation algorithm and obtain very good results.

Referring now to Table 2, below, the efficiency of a subgradient algorithm according to one example is shown (mathematical details of this combination are given).

TABLE 2

| Problem Instance | weight 15 | | | subgradient | | | weight 15 + subgradient | | |
|---|---|---|---|---|---|---|---|---|---|
| | # iter. | run time | serial frac. (%) | # iter. | run time | serial frac. (%) | # iter. | run time | serial frac. (%) |
| 12-30-32-1 | 495 | 1060 | 7.6 | 732 | 1466 | 2.8 | 655 | 1302 | 2.7 |
| 12-30-32-2 | 369 | 933 | 6.0 | 942 | 2240 | 3.8 | 832 | 1951 | 2.8 |

TABLE 2-continued

| Problem Instance | weight 15 | | | subgradient | | | weight 15 + subgradient | | |
|---|---|---|---|---|---|---|---|---|---|
| | # iter. | run time | serial frac. (%) | # iter. | run time | serial frac. (%) | # iter. | run time | serial frac. (%) |
| 12-30-32-3 | 400 | 1224 | 13 | 728 | 1973 | 3.8 | 704 | 1866 | 2.2 |
| 12-80-32-1 | 721 | 3723 | 14 | 1091 | 6791 | 7.0 | 1018 | 4640 | 4.3 |
| 12-80-32-2 | 489 | 2803 | 11 | 1401 | 7548 | 6.9 | 1248 | 6555 | 5.0 |
| 12-80-32-3 | 557 | 4414 | 25 | 1091 | 6805 | 7.0 | 993 | 5749 | 5.6 |
| 20-40-32-1 | | | | | | | | | |
| 20-40-32-2 | | | | | | | | | |
| 20-40-32-3 | 759 | 21k | 57 | 1502 | 21710 | 14 | 1293 | 18k | 9.8 |

Of note, in Table 2 we solve ISO model with linear objective.

Reference will now be made to stabilization.

We use a variant of the stabilization technique of Merle, et al. (1997). This makes the algorithm very efficient, especially regarding problems with quadratic cost functions.

Referring now to Table 3, below, the efficiency of stabilization according to one example is shown.

TABLE 3

| Problem Instance | weight 15 | | | weight 15 + stabilization | | |
|---|---|---|---|---|---|---|
| | # iter. | run time | serial frac. (%) | # iter. | run time | serial frac. (%) |
| 12-30-32-1 | 440 | 650 | 9.2 | 231 | 546 | 7.4 |
| 12-30-32-2 | 295 | 426 | 8.4 | 211 | 429 | 6.2 |
| 12-30-32-3 | 567 | 913 | 11 | 281 | 640 | 9.3 |
| 12-80-32-1 | 667 | 3045 | 12 | 334 | 2422 | 13 |
| 12-80-32-2 | 437 | 1815 | 10 | 271 | 1840 | 10 |
| 12-80-32-3 | 1012 | 4823 | 15 | 411 | 2870 | 14 |
| 20-40-32-1 | 2137 | 8387 | 18 | 892 | 3782 | 16 |
| 20-40-32-2 | 1354 | 3821 | 18 | 454 | 2391 | 16 |
| 20-40-32-3 | 2453 | 10k | 24 | 1109 | 4231 | 21 |

Of note, in Table 3 we solve ISO model with linear objective.

Reference will now be made to two primal heuristics (a roundup heuristic and a constructive heuristic).

In connection with a roundup heuristic according to an embodiment of the invention:

Round the continuous relaxations of binary variables to its closest integer values.

In connection with a constructive heuristic: After the column generation terminates, keep the columns that have solution value greater than a threshold (e.g., 0.95 or 0.90 or 0.97—a solution (e.g., those schedules that are determined) may be assumed to equal 1). For the remaining units, solve a unit commitment problem including the remaining units and with demand value modified accordingly, e.g., from the demand values of each time period, decrease total generation of the units that are kept. In one example, the new demand may equal the old demand minus the generation from the (e.g., 80%) of units that are kept.

In one example, such a heuristic may be carried out a number of times (e.g., 5 or 6 times) toward (or at) the end of the iteration process. In another example, knowledge of being near the end of the iteration process may come from the upper and/or lower bounds.

Referring now to Table 4, below, the efficiency of primal heuristics according to various examples are shown.

TABLE 4

| Problem Instance | linear objective | | quadratic objective | |
|---|---|---|---|---|
| | constructive | roundup | constructive | roundup |
| 6-30-32-3 | 0.02 | 0.05 | 0.00 | 0.00 |
| 6-30-96-3 | 0.00 | 0.01 | 7.61 | 0.03 |
| 6-30-192-3 | 0.00 | 0.03 | 7.70 | 0.03 |
| 6-30-384-3 | 0.05 | 0.37 | 5.34 | 0.14 |
| 7-30-32-3 | 0.00 | 0.08 | 0.00 | 0.00 |
| 9-30-32-3 | 0.00 | 0.19 | 13.63 | 0.25 |
| 12-30-32-3 | 0.00 | 0.11 | 23.96 | 0.10 |
| 12-80-32-3 | 0.00 | 0.08 | 14.29 | 0.02 |
| 12-80-96-3 | 0.01 | 0.09 | 7.62 | 0.15 |
| 12-80-192-3 | 0.01 | 0.09 | 9.24 | 0.19 |
| 12-80-384-3 | 0.02 | 0.07 | 11.92 | 0.15 |
| 12-80-768-3 | 0.02 | 0.06 | 18.21 | 0.23 |
| 20-20-32-3 | 0.00 | 0.11 | 5.92 | 0.03 |
| 20-20-96-3 | 0.02 | 0.10 | 8.40 | 0.05 |
| 20-30-32-3 | 0.00 | 0.13 | 15.72 | 0.04 |
| 20-40-32-3 | 0.01 | 0.23 | 13.21 | 0.21 |
| 20-80-96-3 | 0.01 | 0.32 | 7.23 | 0.09 |
| 24-111-32-3 | 0.01 | 0.45 | 19.82 | 0.12 |
| 24-221-32-3 | 0.01 | 0.23 | 22.82 | 0.04 |

Of note, in Table 4 we solve ISO model and report the percentage optimality gaps of heuristics. The percentages values show how far the best heuristic solution found is from the best known solution to the problem. The algorithm in this example is run only at the root note. In this example, we call the roundup heuristic at every iteration of the algorithm, and the constructive heuristic five times towards the end of the algorithm.

Reference will now be made to two sets of valid inequalities. In one example, we may generate MIR cuts (Mixed Integer Rounding Cuts) and cover cuts. Table 5, below, shows how effective these cutting planes are in improving the lower bound.

Referring still to Table 5, below, the efficiency of valid inequalities according to one example is shown.

TABLE 5

| Problem Instance | duality gap (%) | MIR | | cover | | MIR + cover | |
|---|---|---|---|---|---|---|---|
| | | # cuts | gap (%) | # cuts | gap (%) | # cuts | gap (%) |
| 6-30-32-9 | 2.57 | 0.14 | 62 | 0.64 | 15 | 0.13 | 70 |
| 6-30-96-9 | 0.26 | 0.02 | 47 | 0.07 | 14 | 0.02 | 75 |
| 6-30-192-9 | 0.09 | 0.02 | 101 | 0.02 | 17 | 0.02 | 123 |

TABLE 5-continued

|  | duality | MIR | | cover | | MIR + cover | |
|---|---|---|---|---|---|---|---|
| Problem Instance | gap (%) | gap (%) | # cuts | gap (%) | # cuts | gap (%) | # cuts |
| 6-30-384-9 | 0.09 | 0.01 | 132 | 0.02 | 14 | 0.01 | 122 |
| 7-30-32-9 | 2.39 | 0.15 | 76 | 0.67 | 12 | 0.16 | 103 |
| 9-30-32-9 | 2.03 | 0.12 | 93 | 0.64 | 16 | 0.12 | 109 |
| 12-30-32-9 | 1.56 | 0.09 | 130 | 0.54 | 19 | 0.09 | 159 |
| 12-80-32-9 | 2.87 | 0.21 | 219 | 0.83 | 23 | 0.16 | 222 |
| 12-80-96-9 | 0.38 | 0.08 | 343 | 0.10 | 20 | 0.09 | 301 |
| 12-80-192-9 | 0.21 | 0.06 | 260 | 0.07 | 29 | 0.07 | 289 |
| 12-80-384-9 | 0.11 | 0.06 | 309 | 0.07 | 32 | 0.06 | 339 |
| 12-80-768-9 | 0.15 | 0.03 | 420 | 0.03 | 30 | 0.02 | 450 |
| 20-20-32-9 | 2.34 | 0.19 | 255 | 0.72 | 29 | 0.12 | 290 |
| 20-20-96-9 | 0.81 | 0.09 | 371 | 0.12 | 33 | 0.09 | 380 |
| 20-30-32-9 | 2.71 | 0.33 | 340 | 0.68 | 29 | 0.16 | 391 |
| 20-40-32-9 | 2.69 | 0.22 | 403 | 0.54 | 37 | 0.18 | 452 |
| 20-80-96-9 | 2.85 | 0.28 | 523 | 0.93 | 56 | 0.14 | 582 |
| 24-111-32-9 | 2.71 | 0.21 | 981 | 0.92 | 71 | 0.16 | 1021 |
| 24-221-32-9 | 2.43 | 0.18 | 1261 | 0.78 | 102 | 0.14 | 1230 |

Of note, in Table 5 we solve ISO model with linear objective function. We report the percentage optimality gaps with and without implementing each set of valid inequalities. The duality gap is the distance between the root node solution and the best known feasible solution to the problem. The gaps under respective valid inequalities are the same distance after implementing the corresponding valid inequalities and resolving the root node again and repeating this until no more improvement is obtained.

Reference will now be made benchmarking.

Referring now to Table 6, below, a comparison with Cplex according to one example is shown. More particularly, in this example, we test our approach on a set of stochastic unit commitment problem instances: For instance, 6-30-32-1 means an instance with 6 time periods, 30 scenarios, 32 units, and instance 1; and 12-80-96-3 means an instance with 12 time periods, 80 scenarios, 96 units, and instance 3. In Table 6, we compare our algorithm with Cplex that solves model (3) on a set of problem instances. We solve the instances with quadratic objective (the left columns) for an hour and report the remaining optimality gaps. In these instances, Cplex cannot usually find a feasible solution, hence cannot provide a gap. Our algorithm provides better optimality gaps. In some instances our algorithm can solve the problem to 10-4 optimality within an hour. In these, we give the solution time in seconds (the ones without the percentage sign). We solve the problem instances with linear objective function to 10-4 optimality and report the solution times in seconds.

TABLE 6

| quadratic objective | | | linear objective | | |
|---|---|---|---|---|---|
| Problem Instance | BCP | Cplex | Problem Instance | BCP | Cplex |
| 6-30-32-3 | 17 | 2.08% | 6-30-32-1 | 45 | 10 |
| 6-30-96-3 | 128 | 16.59% | 6-30-96-1 | 137 | 82 |
| 6-30-192-3 | 340 | 18.46% | 6-30-192-1 | 187 | 205 |
| 6-30-384-3 | 508 | na | 6-30-384-1 | 396 | 1848 |
| 7-30-32-3 | 108 | 6.34% | 6-30-768-1 | 526 | 21255 |
| 9-30-32-3 | 0.02% | 12.85% | 20-20-32-1 | | |
| 12-30-32-3 | 0.13% | 23.50% | 20-20-96-1 | | |
| 12-80-32-3 | 0.22% | 3.20% | 20-20-192-1 | | |
| 12-80-96-3 | 0.24% | na | 20-20-384-1 | | |
| 12-80-192-3 | 0.23% | na | 20-20-768-1 | | |
| 12-80-384-3 | 0.32% | na | 12-80-32-1 | | |
| 12-80-768-3 | 0.39% | na | 12-80-96-1 | | |
| 20-20-32-3 | 1.62% | na | 12-80-192-1 | | |
| 20-20-96-3 | 0.54% | na | 12-80-384-1 | | |
| 20-30-32-3 | 1.89% | 1.76% | 12-80-768-1 | | |
| 20-40-32-3 | 1.95% | na | | | |
| 20-80-96-3 | 0.23% | na | | | |
| 24-111-32-3 | 1.50% | na | | | |
| 24-221-32-3 | 1.96% | na | | | |

Of note, in Table 6 we solve the ISO model. In the first portion, in one example, we solve problems with quadratic objective functions and run the algorithm for one hour. We report the running time of the algorithm if it terminates within one hour, or remaining optimality gaps if it does not. In the second portion, in one example, we solve problems with linear cost functions and run the algorithm until a solution within 0.01% optimality is obtained.

Reference will now be made parallelization.

Referring now to Tables 7 and 8, below, these tables provide examples showing the speedups obtained from the parallelization.

TABLE 7

Speedup results for parallelization

| Prob. inst. | ser'l time | speedup on multiple processors | | | | |
|---|---|---|---|---|---|---|
| | | 2 | 4 | 8 | 16 | 32 |
| 6-30-32-3 | 147 | 1.90 | 3.58 | 6.58 | 10.83 | 17.77 |
| 6-30-96-3 | 455 | 1.91 | 3.75 | 7.12 | 11.07 | 19.76 |
| 6-30-192-3 | 587 | 1.93 | 3.78 | 7.29 | 12.07 | 19.65 |
| 6-30-384-3 | 948 | 1.95 | 3.85 | 7.45 | 12.98 | 20.50 |
| 7-30-32-3 | 200 | 1.65 | 3.25 | 5.57 | 10.14 | 16.72 |
| 9-30-32-3 | 322 | 1.70 | 3.68 | 6.04 | 10.24 | 17.59 |
| 12-30-32-3 | 488 | 1.94 | 3.69 | 6.50 | 11.73 | 17.79 |
| 12-80-32-3 | 1054 | 1.83 | 3.62 | 6.27 | 10.68 | 18.52 |
| 12-80-96-3 | 3301 | 1.85 | 3.70 | 6.66 | 12.79 | 22.78 |
| 12-80-192-3 | 6943 | 1.89 | 3.71 | 7.67 | 14.31 | 24.03 |
| 12-80-384-3 | 13505 | 1.90 | 3.73 | 7.81 | 15.24 | 23.75 |
| 12-80-768-3 | 27169 | 1.91 | 3.80 | 7.89 | 15.58 | 23.68 |
| 20-20-32-3 | 277 | 1.83 | 3.60 | 6.68 | 12.95 | 19.27 |
| 20-20-96-3 | 1734 | 1.85 | 3.66 | 7.20 | 13.27 | 22.64 |
| 20-30-32-3 | 542 | 1.85 | 3.65 | 7.82 | 15.74 | 20.42 |
| 20-40-32-3 | 877 | 1.82 | 3.59 | 7.80 | 15.44 | 20.32 |
| 20-80-96-3 | 7200 | 1.89 | 3.66 | 7.83 | 15.64 | 22.88 |
| 24-111-32-3 | 4983 | 1.66 | 3.45 | 6.81 | 12.72 | 17.65 |
| 24-221-32-3 | 27126 | 1.64 | 3.15 | 5.83 | 11.14 | 14.06 |
| Average | | 1.83 | 3.62 | 6.95 | 12.73 | 19.80 |

Note, in these examples, we solve a utility model with quadratic cost and with buying and selling costs of $40 and $15 per megawatts. The problems are solved to within 0.01% optimality.

TABLE 8

Solving large problems with parallelization.

| Problem Instance | problem size | | | ISO model ('−1' instances) | | Utility model ('−3' instances) | |
|---|---|---|---|---|---|---|---|
| | # binaries | # continuous variables | # constraints (≈) | gap (%) | speedup | solution time | speedup |
| 24-111-32 | 32 × 1399 | 2 × 32 × 1399 | 8 × 32 × 1399 | 0.15 | 18.99 | 311 | 16.41 |
| 24-111-96 | 96 × 1399 | 2 × 96 × 1399 | 8 × 96 × 1399 | 0.05 | 17.19 | 1085 | 18.18 |
| 24-111-192 | 192 × 1399 | 2 × 192 × 1399 | 8 × 192 × 1399 | 0.15 | 19.49 | 1894 | 22.14 |
| 24-111-384 | 384 × 1399 | 2 × 384 × 1399 | 8 × 384 × 1399 | 0.08 | 20.37 | 3043 | 24.44 |
| 24-111-768 | 768 × 1399 | 2 × 768 × 1399 | 8 × 768 × 1399 | 0.08 | 22.15 | 4869 | 27.50 |
| 24-111-1536 | 1536 × 1399 | 2 × 1536 × 1399 | 8 × 1536 × 1399 | 0.11 | 24.43 | 7791 | 29.22 |
| 24-221-32 | 32 × 2774 | 2 × 32 × 2774 | 8 × 32 × 2774 | 0.29 | 17.82 | 2125 | 15.26 |
| 24-221-96 | 96 × 2774 | 2 × 96 × 2774 | 8 × 96 × 2774 | 0.15 | 18.28 | 5737 | 18.54 |
| 24-221-192 | 192 × 2774 | 2 × 192 × 2774 | 8 × 192 × 2774 | 0.32 | 18.93 | 1037 | 22.66 |
| 24-221-384 | 384 × 2774 | 2 × 384 × 2774 | 8 × 384 × 2774 | 0.24 | 19.59 | 1653 | 25.50 |
| 24-221-768 | 768 × 2774 | 2 × 768 × 2774 | 8 × 768 × 2774 | 0.32 | 21.50 | 26.7k | 28.02 |
| 24-221-1536 | 1536 × 2774 | 2 × 1536 × 2774 | 8 × 1536 × 2774 | 0.27 | 23.98 | 42.3k | 29.79 |

Note, in these examples, both models have linear cost functions and run on 32 processors. For ISO model, we run the algorithm for one hour, and for utility model we run it until we obtain a solution within 0.01% optimality.

Of note, throughout the text the terms 'ISO model' and 'utility model' are used. The term ISO model means the problem given by (3). The term utility model refers to a model same as (3) except it has market buying and selling variables that go into objective function (3a) and the demand constraint (3b), without affecting the other constraints and variables, such as, for example:

$$\min_{\ldots,g,m^+,m^-,\ldots} \ldots + \sum_{n \in N} (p^+ m_n^+ - p^- m_n^-) + \ldots \text{ s.t.}$$

$$\sum_{i \in I} g_{in} + m_n^+ - m_n^- \geq d_n, \quad n \in N,$$

$$m_n^+ > 0, m_n^- > 0, \quad n \in N,$$

$$\ldots \qquad \ldots$$

The original model (3) is called "ISO model" since it is mainly used by ISOs, and the model described above is called "utility model" since this may be used by vertically-integrated utilities that can also buy power from and/or sell it into the market. In one example, parameters $p^+=\$40$, and $p^-=\$15$.

In one embodiment, a parallel decomposition algorithm (e.g., branch-cut-price algorithm) is provided to solve large-scale stochastic optimization problems, specifically the unit commitment problem. The algorithm may run in a branch-and-bound framework. The algorithm may run column and cut generation algorithms at every node of the branch-and-bound tree. The algorithm may generate columns and cuts on multiple cores in parallel. The algorithm may be implemented in the COIN-OR optimization framework (e.g., using C/C++ as a computing language and MPI as a parallel programming library).

In another embodiment, an algorithm may be based on branch-price, but more general. In another embodiment an algorithm may include a cut-generation (which is called branch-cut-price). In another embodiment, an algorithm may lend itself to parallel computation, a weighted column generation scheme, and/or a constructive heuristic.

In another embodiment, an algorithm may utilize/provide parallelization and/or dual weighting.

In another embodiment, the COIN-OR and/or COIN-BCP packages may be utilized.

In another embodiment, branch-price is applied to a stochastic unit commitment problem.

In another embodiment, various "exact algorithms" (to which branch-price belongs) may be provided. In one example, such "exact algorithms" may guarantee a certificate of optimality.

Referring now to FIG. 1, this FIG. shows a hardware configuration of computing system 100 according to an embodiment of the present invention. As seen, this hardware configuration has at least one processor or central processing unit (CPU) 111. The CPUs 111 are interconnected via a system bus 112 to a random access memory (RAM) 414, read-only memory (ROM) 116, input/output (I/O) adapter 118 (for connecting peripheral devices such as disk units 121 and tape drives 140 to the bus 112), user interface adapter 122 (for connecting a keyboard 124, mouse 126, speaker 128, microphone 132, and/or other user interface device to the bus 112), a communications adapter 134 for connecting the system 100 to a data processing network, the Internet, an Intranet, a local area network (LAN), etc., and a display adapter 136 for connecting the bus 112 to a display device 138 and/or printer 139 (e.g., a digital printer or the like).

Figure 2:
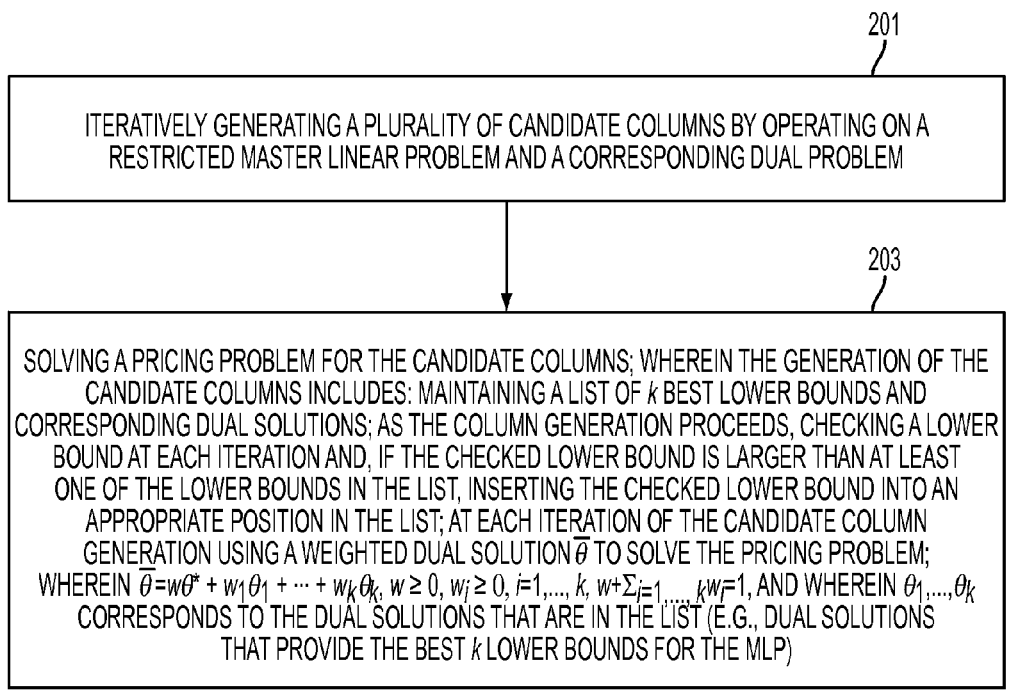
FIG. 2 depicts a flowchart according to an embodiment of the present invention.

Referring now to FIG. 2, a flowchart according to an embodiment of the present invention is shown. As seen, in this example, step 201 is iteratively generating a plurality of candidate columns by operating on a restricted master linear problem and a corresponding dual problem. Further, step 203 is solving a pricing problem for the candidate columns; wherein the generation of the candidate columns includes: maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list; at each iteration of the candidate column generation using a weighted dual solution 9 to solve the pricing problem;

wherein $\bar{\theta}=w\theta^*+w_1\theta_1+\ldots+w_k\theta_k$, $w \geq 0$, $w_i \geq 0$, $i=1,\ldots,k$, $w+\Sigma_{i=1,\ldots,k} w_i = 1$, and wherein $\theta_1,\ldots,\theta_k$ corresponds to the dual solutions that are in the list (e.g., dual solutions that provide the best k lower bounds for the MLP).

Figure 3:
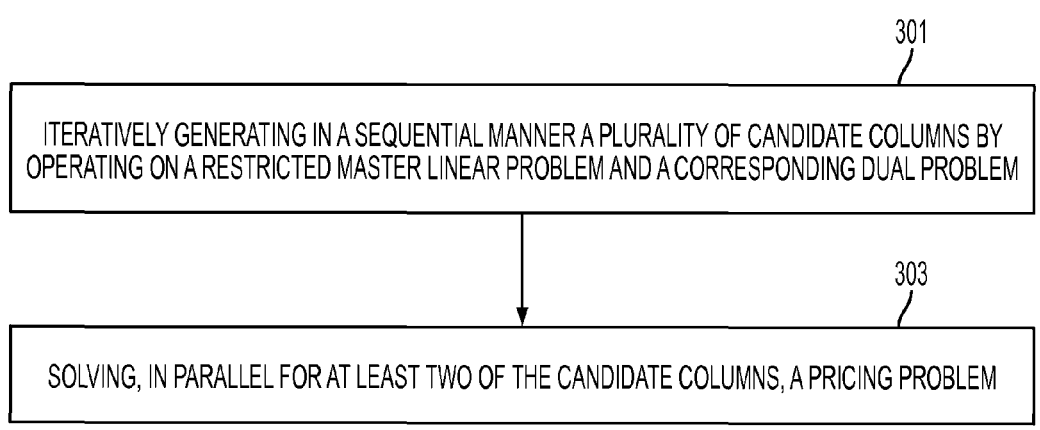
FIG. 3 depicts a flowchart according to an embodiment of the present invention.

Referring now to FIG. 3, a flowchart according to an embodiment of the present invention is shown. As seen, in this example, step 301 is iteratively generating in a sequential manner a plurality of candidate columns by operating on a restricted master linear problem and a corresponding dual problem. Further, step 303 is solving, in parallel for at least two of the candidate columns, a pricing problem.

Figure 4:
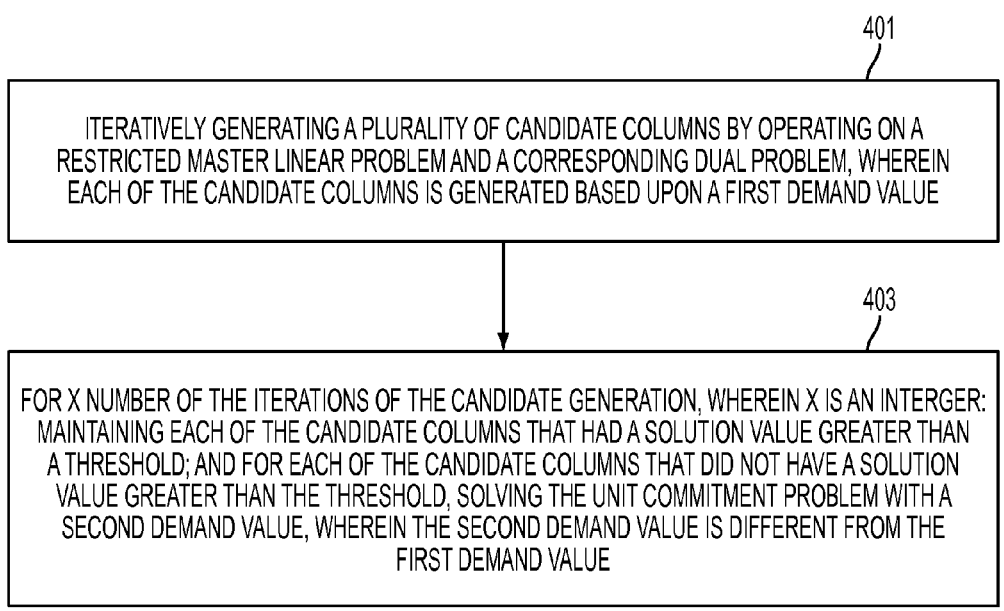
FIG. 4 depicts a flowchart according to an embodiment of the present invention.

Referring now to FIG. 4, a flowchart according to an embodiment of the present invention is shown. As seen, in this example, step 401 is iteratively generating a plurality of candidate columns by operating on a restricted master linear problem and a corresponding dual problem, wherein each of the candidate columns is generated based upon a first demand value. Further, step 403 is for x number of the iterations of the candidate generation, wherein x is an integer: maintaining each of the candidate columns that had a solution value greater than a threshold; and for each of the candidate columns that did not have a solution value greater than the threshold, solving the unit commitment problem with a second demand value, wherein the second demand value is different from the first demand value.

In another example, various embodiments may relate to data analytics and modeling (e.g., industrial). In another example, various embodiments may relate to manufacturing operations (e.g., industrial). In another example, various embodiments may be aligned with the "Smarter Planet" initiative (e.g., energy distribution and Intelligent Utility Networks (IUN) and/or resource management).

As described herein, a branch-cut-price algorithm may be applied to energy.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A system for solving a stochastic unit commitment problem using a branch-cut-price algorithm, the system comprising one or more processor units configured for:
    iteratively generating a plurality of candidate columns by operating on a restricted master linear problem and a corresponding dual problem; and
    solving a pricing problem for the candidate columns;
    wherein the generation of the candidate columns includes:
        maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list;
        at each iteration of the candidate column generation using a weighted dual solution $\bar{\theta}$ to solve the pricing problem; wherein $\bar{\theta} = w\theta^* + w_1\theta_1 + \ldots + w_k\theta_k$, $w \geq 0$, $w_i \geq 0$, $i = 1, \ldots, k$, $w + \Sigma_{i=1,\ldots,k} w_i = 1$, wherein $\theta_1, \ldots, \theta_k$ corresponds to the dual solutions that are in the list, wherein $\theta^*$ is the current optimal solution for the dual and wherein $k > 1$.

2. The system of claim 1,
    wherein the restricted master linear problem comprises:
        min $c'\lambda$
        s.t. $A'\lambda \geq b$ : $\theta^*$
        $e\lambda = 1$ : $\alpha^*$
        $\lambda \geq 0$;
    wherein the corresponding dual problem comprises:
        max $\alpha$
        s.t. $\theta(A'-b) + \alpha \leq c'$ : $\lambda^*$
        $\theta \geq 0$;
    wherein the pricing problem comprises:

$$\min_j c_j - \theta^*(A_j - b) - \alpha^* \Leftrightarrow \min_{x \in X}(c - \theta^*(A - b))x - \alpha^* \equiv z^* - \alpha^*;$$

and
    wherein e is the vector of ones and $\lambda^*$, $\theta^*$, $\alpha^*$ are the the optimal primal and dual solutions.

3. The system of claim 1, wherein the generation of the candidate columns includes:
    maintaining the list of k best lower bounds; wherein the corresponding dual solutions are $(\theta_1, \alpha_1), (\theta_2, \alpha_2), \ldots, (\theta_k, \alpha_k)$ such that $z_1 \leq z_2 \leq \ldots \leq z_k$ where $z_i, i = 1, \ldots, k$ are the optimal value of the pricing problem when $\theta_i$ is used; as the column generation proceeds, checking the lower bound at each iteration, and, if the checked lower bound is better than at least one of the lower bounds in the list, inserting the checked lower bound into the appropriate position in the list;
    at each iteration of the candidate column generation using a weighted dual solution $\bar{\theta}$ to solve the pricing problem; wherein $\bar{\theta} = w\theta^* + w_1\theta_1 + \ldots + w_k\theta_k$, $w \leq 0$, $w_i \leq 0$, $i = 1, \ldots, k$, $w + _{=1,\ldots,k} w_i = 1$, and wherein $\theta_1, \ldots, \theta_k$ corresponds to the dual solutions that are in the list.

4. The system of claim 1, wherein the stochastic unit commitment problem relates to energy.

5. The system of claim 4, wherein the stochastic unit commitment problem relates to power generation.

6. The system of claim 5, wherein each of the candidate columns comprises a schedule for a respective power generator.

7. The system of claim 5, wherein the pricing problem is solved for each of a plurality of power generators.

8. The system of claim 7, wherein the steps are carried out in the order recited.

9. An article of manufacture, comprising:
    at least one tangible computer usable device having a computer readable program code logic tangibly embodied therein to execute at least one machine instruction in a processing unit for solving a stochastic unit commitment problem using a branch-cut-price algorithm, said computer readable program code logic, when executing, performing the following steps:
    iteratively generating a plurality of candidate columns by operating on a restricted master linear problem and a corresponding dual problem; and
    solving a pricing problem for the candidate columns;
    wherein the generation of the candidate columns includes:
        maintaining a list of k best lower bounds and corresponding dual solutions; as the column generation proceeds, checking a lower bound at each iteration and, if the checked lower bound is larger than at least one of the lower bounds in the list, inserting the checked lower bound into an appropriate position in the list;
        at each iteration of the candidate column generation using a weighted dual solution $\bar{\theta}$ to solve the pricing problem; wherein $\bar{\theta} = w\theta^* + w_1\theta_1 + \ldots + w_k\theta_k$, $w \geq 0$, $w_i \geq 0$, $i = 1, \ldots, k$, $w + \Sigma_{i=1,\ldots,k} w_i = 1$, wherein $\theta_1, \ldots, \theta_k$ corresponds to the dual solutions that are in the list, wherein $\theta^*$ is the current optimal solution for the dual and wherein $k > 1$.

10. The system of claim 1, further comprising generating energy at a set of generators based upon a solution to the pricing problem.

11. The system of claim 10, further comprising generating the energy according to an optimal up and down schedule and corresponding generation amounts for the set of generators over a planning horizon.

12. The system of claim 11, further comprising generating the energy according to the optimal up and down schedule and the corresponding generation amounts for the set of generators over the planning horizon so that a total cost of generation and transmission is minimized.

13. The system of claim 12, further comprising generating the energy according to the optimal up and down schedule and the corresponding generation amounts for the set of generators over the planning horizon so that the total cost of generation and transmission is minimized and a set of constraints is observed.

* * * * *